(12) United States Patent
Wyatt et al.

(10) Patent No.: US 10,802,004 B2
(45) Date of Patent: Oct. 13, 2020

(54) ANALYTICS SYSTEM AND USER INTERFACE THEREFOR

(71) Applicant: MAX Analytical Technologies, Inc., East Windsor, CT (US)

(72) Inventors: Eddie Dean Wyatt, Havertown, PA (US); Peter Paul Behnke, Vernon, CT (US); Martin L. Spartz, Ellington, CT (US)

(73) Assignee: MLS ACQ, Inc., East Windsor, CT (US)

( * ) Notice: Subject to any disclaimer, the term of this patent is extended or adjusted under 35 U.S.C. 154(b) by 430 days.

(21) Appl. No.: 15/674,132

(22) Filed: Aug. 10, 2017

(65) Prior Publication Data

US 2018/0045693 A1   Feb. 15, 2018

Related U.S. Application Data

(60) Provisional application No. 62/372,959, filed on Aug. 10, 2016.

(51) Int. Cl.
   *G01N 30/74*   (2006.01)
   *G01N 30/86*   (2006.01)
   *G01N 30/02*   (2006.01)

(52) U.S. Cl.
   CPC ......... *G01N 30/74* (2013.01); *G01N 30/8651* (2013.01); *G01N 30/8644* (2013.01); *G01N 30/8696* (2013.01); *G01N 2030/025* (2013.01); *G01N 2030/743* (2013.01)

(58) Field of Classification Search
   CPC .......... G08B 7/06; G08B 21/02; G08B 21/22; G01T 7/00; G01T 1/02
   See application file for complete search history.

(56) References Cited

U.S. PATENT DOCUMENTS 9,606,088 B2    3/2017  Spartz et al.
   2015/0260695 A1*  9/2015  Spartz ................ G01N 30/8606
                                                250/339.01

OTHER PUBLICATIONS

Jackson et al. "Investigation of High Sensitivity GCFTIR as an Analytical Tool for Structural Identification", Journal of High Resolution Chromatography vol. 16, Sep. 1993, pp. 515-521 (Year: 1993) (Year: 1993).*

* cited by examiner

*Primary Examiner* — David P Porta
*Assistant Examiner* — Meenakashi S Sahu
(74) *Attorney, Agent, or Firm* — HoustonHogle LLP

(57) ABSTRACT

An analysis system includes a separation system that provides compounds to a sample cell of a spectrometric system. The system analyzes spectral information from the spectrometric system by optimizing retention windows for the compounds and identifies quantities of the compounds by comparing spectral information within and outside the respective retention windows. Information is displayed in windows of a user interface.

18 Claims, 17 Drawing Sheets

ANALYTICS SYSTEM AND USER INTERFACE THEREFOR

RELATED APPLICATIONS

This application claims the benefit under 35 USC 119(e) of U.S. Provisional Application No. 62/372,959, filed on Aug. 10, 2016, which is incorporated herein by reference in its entirety.

BACKGROUND OF THE INVENTION

Spectrometry-based gas analyzers, such as Fourier transform infrared spectrometry (FTIR) gas analyzers, are becoming common for environmental compliance applications and process gas monitoring, in addition to other gas analysis applications. They are generally good for measuring compounds from 0.1 parts per million (ppm) to a few percent levels in environmental exhaust, for example. On the other hand, spectrometry-based gas analyzers generally perform poorly when parts per billion (ppb) detection levels are required. Moreover, if too many compounds are present (e.g., greater than 10-20) or too many unknowns are present, the analysis of the spectral data becomes too difficult and the results become somewhat questionable.

Gas chromatography (GC) is an analytical method for separating chemical substances. It relies on differences in partitioning behavior between a flowing mobile phase (gas phase) and a stationary phase supported in a column to separate the compounds in a mixture. As the gas flow passes through the column, the compounds of the sample move at velocities that are influenced by the degree of interaction of each component with the stationary phase in the column. Consequently, the different compounds separate as the compounds elute from the column.

Gas chromatography can be utilized for many compounds but also has many drawbacks, which include a need for full peak separation to qualify and quantify compounds present, small sample sizes and dynamic ranges, and continuing calibration.

Combined GC-FTIR systems are also known in the industry. In fact, such systems have been available for decades. They have not been widely accepted, however, because other GC detectors are more sensitive.

More recently however, a new class of GC-FTIR analysis systems have been proposed. They are characterized by spectrometric sample cells that partially or fully integrate the components/compounds flowing from the GC over time. They use signal analysis techniques to remove the spectral contribution of earlier component peaks and water flowing from the GC to identify the currently eluting compounds. Such systems are disclosed, for example, in U.S. Pat. No. 9,606,088 by Spartz et al., which application is incorporated herein by this reference in its entirety.

SUMMARY OF THE INVENTION

The present invention concerns a user interface for an analytics system such as a GC-FTIR system.

In general, according to one aspect, the invention features a user interface for displaying information from an analytics system having a separation system and a spectrometric system. The user interface comprises a chromatogram plot displaying chromatograph signal as a function of time showing compounds eluting from the separation system, an absorbance spectrum plot that provides absorbance spectra corresponding to the chromatograph signals for the compounds, and a playback function that displays chromatograph signal in the chromatogram plot over the course of a run of the separation system and the corresponding detected absorbance spectra in the absorbance spectrum plot.

In embodiments, the playback occurs at a higher speed than the run of the separation system from which the absorbance spectra were obtained, such as at at least 5 times faster than the run of the separation system from which the absorbance spectra were obtained.

In a current embodiment, the chromatogram plot is a pseudo chromatogram plot.

Preferably, the separation system is a gas chromatography system and the spectrometric system is a Fourier transform infrared spectrometry system.

An absorbance spectral data file list can also be shown, having the files containing the absorbance spectra.

Additionally, upper and lower spectral range markers can be displayed on the absorbance spectrum plot indicating the portion of the absorbance spectra that were used to calculate the chromatogram signal of the chromatogram plot.

In general, according to another aspect, the invention features a sample analysis system. The system comprises a gas chromatography system for separating a sample into its components and a Fourier transform infrared spectrometry system for collecting absorbance spectra of the compounds. A computer system receives the absorbance spectra and generates a user interface on a display device. This user interface comprises a chromatogram plot displaying chromatograph signal as a function of time showing compounds eluting from the gas chromatography system, an absorbance spectrum plot that provides the absorbance spectra generated by the Fourier transform infrared spectrometry system; and a playback function that displays chromatograph signal in the chromatogram plot over the course of a run of the gas chromatography system and the corresponding detected absorbance spectra in the absorbance spectrum plot.

In general, according to another aspect, the invention features a user interface for displaying information from an analytics system having a separation system and a spectrometric system. This user interface comprises a chromatogram plot displaying chromatograph signal as a function of time showing compounds eluting from the separation system and an absorbance spectrum plot that provides absorbance spectra corresponding to the chromatograph signals for the compounds. A list of compounds is further provide, for which calibration spectra are available. The selection of a compound from the list of compounds causes the analytics system to access absorbance spectral data files acquired during a run of the separation system at a time when the selected compound would have eluted from the separation system and determine an amount of the selected compound.

According to another aspect, the invention features a user interface for displaying information from an analytics system having a separation system and a spectrometric system, the user interface comprising pseudo-chromatogram plot, wherein selecting compound from a file list causes a corresponding chromatogram to be highlighted.

In general, according to another aspect, the invention features a user interface for displaying information from an analytics system having a separation system and a spectrometric system. The user interface comprises a calibration spectral plot displaying a calibration spectra and a peak tracking function that generates one or more tracking lines that are displayed in the calibration spectral plot, wherein the analytics system will find peaks indicated by the lines when analyzing the spectra from the spectrometric system to provide an indicator of whether or not the gas is present in a sample.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

As used herein, the singular forms and the articles "a", "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
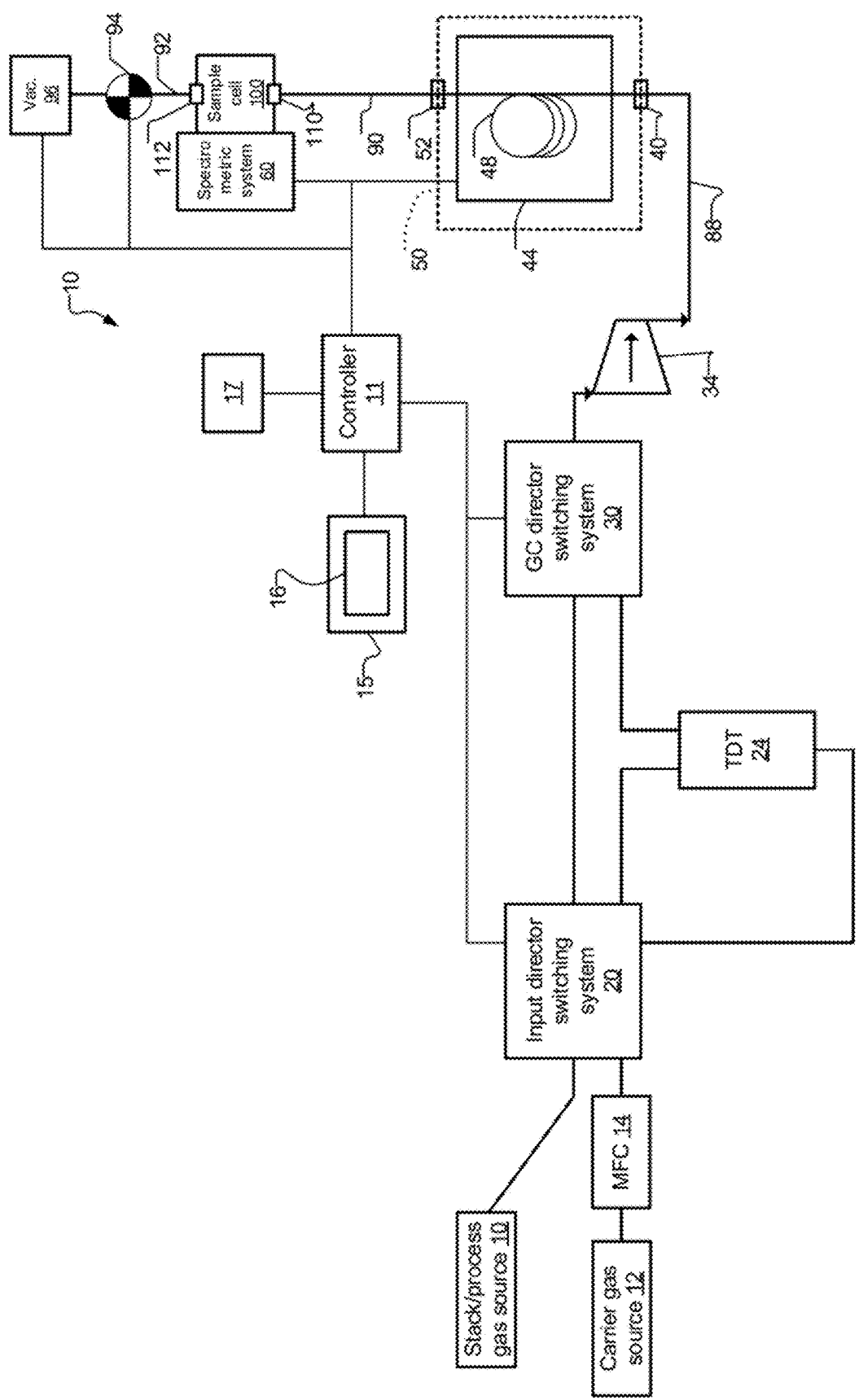
FIG. 1 is a schematic diagram of an exemplary analysis system, to which the principles of the present invention can be applied.

An exemplary analysis system 10, to which the principles of the present invention can be applied, is shown in schematic form in FIG. 1.

Generally, the system 10 includes a separator 50 for separating a sample, such as a gas sample, into its components (e.g., separate compounds), a spectrometric system 60 for detecting the spectral response, sample spectra, of those compounds in a sample cell 100, and a controller 11 that controls the system and uses the spectra to identify the compounds of the sample and their concentrations.

In different implementations, the spectrometric system 60 determines the spectral response of the compounds in the sample cell 100 in one or more of the following spectral regions: near-, mid- and/or far-infrared, visible, and/or ultraviolet (UV) (including vacuum ultraviolet (VUV)). Further, the spectrometric system can measure different characteristics, such as absorption spectra, emission (including blackbody or fluorescence) spectra, elastic scattering and reflection spectra, and/or inelastic scattering (e.g., Raman and Compton scattering) spectra of the compounds in the sample cell.

In the case of optical spectrometric systems, for example, different technologies can be employed. In Fourier transform infrared spectrometry (FTIR) systems, single beam spectra are generated by taking the raw interferograms from the FTIR spectrometer and then converting those interferograms to intensity versus wavenumber spectra. In other situations, spectra might be directly read-out as in the case where the spectrometric system 60 is a post dispersive system, which includes a broadband source and a spectrally resolving detector system. In other examples, the spectrometric system 60 includes a tunable optical source (e.g., tunable laser) and a detector. Here, the spectral information is a function of the time response of the detector, in such a pre-dispersive system.

In general, the spectrometry system 60 is preferably sufficiently sensitive so that by analysis of the spectral information, the controller 11 is able to detect at least some of the sample compounds with low concentration, such as in a few percent to low parts per million concentrations, or lower to parts per billion. To facilitate such sensitivity, the sample cell 100 is usually a multiple pass cell such as a White cell or modified White cell with aspherical optics.

In the current embodiment, the spectrometric system 60 is a FTIR system. Its sample cell 100 has an inlet port 110 for receiving a separator line 90. The sample cell 100 of the spectrometric system 60 has an outlet port 112 for venting the sample cell contents through exit line 92. An exit valve 94 seals and controls the flow from the sample cell 100. A vacuum pump 96 is further provided after the exit valve 94 so that a vacuum or partial vacuum can be drawn on the sample cell 100.

The compounds of the sample are separated in time by the separation system 50, which is preferably a gas chromatography system. The GC system has a gas chromatographic column 48. Often the column 48 is coiled in order to minimize the size while maintaining sufficient tube or column length. Column 48 has a proximate end or inlet 40 for receiving sample from sample inlet line 88 and distal end or outlet 52 for directing resulting product through line 90 to the sample cell 100 for the spectrometry system 60.

The column 48 is typically contained within a temperature controlled chamber 44 with a heat source (oven), such as a heating coil that is thermostatically controlled by the controller 11 in order to maintain a selected constant temperature during a gas chromatography analysis run. The heat source should also provide sufficient heat to the chamber interior so that a temperature is sufficiently high to ensure that the sample reaches a gaseous state. In a current implementation, the column 48 is resistively heated. This avoids the need for the oven. Specifically, the column 48 is heated directly, by passing a current through the metal column and monitoring the resistance to know the temperature.

Nevertheless, often compounds are not sufficiently concentrated to be adequately identified and measured. As a result, in the same analysis system 10, a sample can be first concentrated prior to separation. In these circumstances, the samples are passed through a concentrator 24, then separated in the separation system 50 and then analyzed by the spectrometric system 60. Examples of concentrators suitable for such purpose are thermal desorption tubes (TDT) or cold (cryo) traps. Further, if the samples have trace concentrations, for example in the parts per billion or parts per trillion, a series of concentrators can be used in the analysis system 10. Such configurations allow the same system to be used for a wide variety of samples and sampling conditions.

In one mode of operation, the sample flows through the gas cell 100 and out through the exit valve 94 and multiple spectra are obtained over time by the spectrometry system 60 and possibly averaged for detection limit reduction, i.e., enhancing detection sensitivity.

In another mode of operation, the vacuum pump 96 draws a vacuum on the gas cell 100 and then the exit valve 94 is shut. In this mode, the cell 100 integrates and collects compounds of a sample for a certain time period. Here, the sample cell 100 has been partially or fully evacuated at the beginning of the run. Then, fluid compounds, e.g., gas(es), are allowed to accumulate in the sample cell 100, integrating their spectral signatures. Multiple spectra obtained over a time interval can then be averaged to best measure the integrated concentration in the sample cell. Then, the final spectra are used as a background spectra and new spectra are obtained as new compounds flow into the integrating sample cell 100. The spectra of the new compounds are obtained by comparing the current spectra to the background spectra. Then this process is repeated. Such a system is generally described in U.S. Pat. No. 9,606,088.

System 10 further includes an input director switching system 20 and a GC director switching system 30 for controlling the flow of gases into and out of the TDT 24 and the GC 50.

The input director switching system 20 is connected for receiving sample gas from source 10 such as process gas or gas from a stack. It also connects to a carrier gas source 12, such as nitrogen, helium or other essentially inert gas that will not interfere with detecting the gases of interest such a pollutants and other impurities. A mass flow controller 14 is preferably provided in-line between the carrier gas source 12 and the input director 20 to control the flow rate of the carrier gas. The input director switching system 20 then selective) connects either of these two sources directly to the GC director switching system 30 or to the TDT 24.

The GC director switching system 30 is connected for receiving sample or carrier gas from the input director switching system 20 or gas desorbing from the TDT 24. The output director switching system 30 then provides gas to the GC 50. Possibly a compressor 34 is provided inline between the GC director switching system 30 and the GC 50.

By control of the input director switching system 20 and the GC director switching system 30, a gas sample can be concentrated in the TDT and then desorbed into the GC 50 or the TDT 24 can be bypassed and the gas sample provided directly to the GC 50.

In practice, the functions of the controller 11 are often distributed among multiple computer systems. For example, one computer system will often perform the functions of real-time control of the system 10 and collecting and logging the data from the system 10. This includes controlling the flow of gases and liquids throughout the system 10 by controlling one or more MFCs, e.g., 14, input director 20, GC director 30, collection and desorption of TDT 24, valves, e.g., 94, compressor 34, vacuum pump 96, and separator 50 in addition to the other compounds of the system 10. The real-time control functions further include collecting and recording the spectral information from the spectrometry system 60. Then, a second computer system will often be utilized to analyze that data and identify the specific compounds of the sample. This includes analyzing the spectral information and how that information changes over time and recording and reporting the components/compounds present with their concentrations or mass to an operator via a user interface or to another computer. These data are compared with known preset amounts of concentrations (e.g., determined in a calibration procedure) that the spectrometry system 60 is capable of detecting.

In the illustrated example, the user interface 16 is presented on display device 15 that is driven by the controller 11. One or more user input devices 17 are also commonly present such as keyboards, touchscreen detection systems, computer pointing devices, etc.

Figure 2:
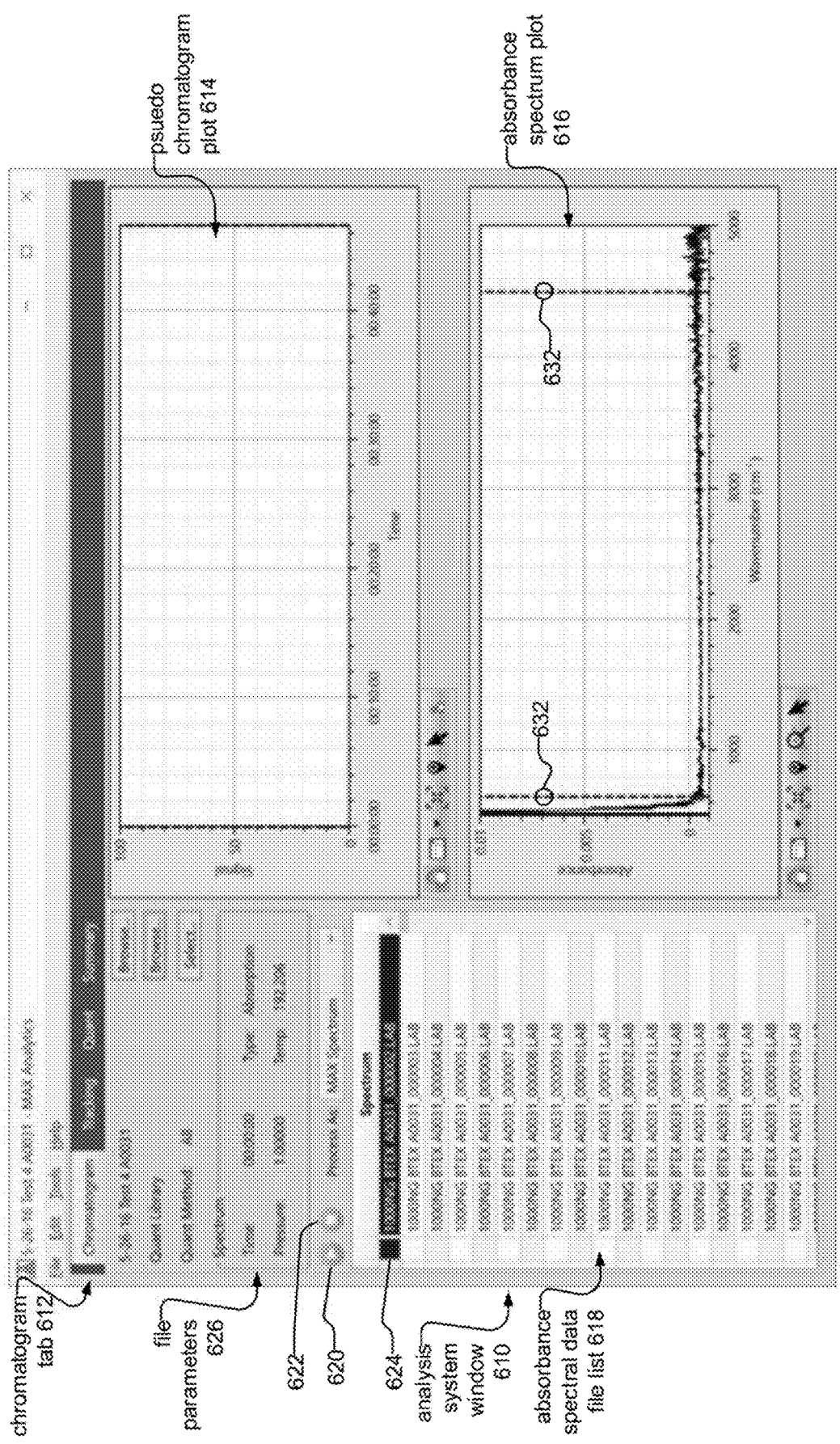
FIG. 2 shows a window of the analysis system's user interface that is displayed on the controller display device, the window showing a chromatogram tab.

FIG. 2 is an analytics system window 610 that is generated by the controller 11 of the analytics system 10 or other computer system and rendered on the display device 15 as part of the user interface 16.

Specifically shown is the chromatogram tab 612 of the analytics system window 610. Generally, the chromatogram tab 612 comprises a pseudo-chromatogram plot 614, an absorbance spectrum plot 616, and an absorbance spectral data file list 618.

The pseudo-chromatogram plot 614 plots the measured mass of the compounds eluding from the GC 50 as a function of time through the GC run. The peaks, in nanograms, are calculated using Beer's law using the absorbance spectra detected by the spectrometric system 60 and the stored calibration spectrum for compounds covered by the system.

The absorbance spectrum plot 616 shows the instantaneous or detected absorbance spectrum that was detected at a specific point in time in the GC run, that typically extends for 10's of minutes to 30 minutes or longer. Specifically, the absorbance spectral data file list 618 lists all of the spectra generated during the GC run by the spectrometric system 60 and are listed in chronological order. The specific highlighted file 624 shows the spectrum that is displayed in the absorbance spectrum plot 616.

Also included in the chromatogram tab 612 are a play graphical button 620 and a stop graphical button 622. The play and stop function controlled by these buttons is used to show the evolution of GC run by showing the generation of the pseudo-chromatogram plot 614 and the display of the absorbance spectral data file list 618 files in the absorbance spectrum plot. In short, by hitting the play button, the user can see the peaks generated in the pseudo-chromatogram plot 614 over the course of the 50 minute, for example, GC run and the corresponding detected absorbance in the absorbance spectrum plot 616 that would correspond to those successive peaks shown in the chromatogram plot 614. Typically, this playback occurs at greater than 5 times, and commonly at 10 times (10×) the speed of the original GC run or faster. As a result, the playback will last for less than a minute for a run that might have taken 30 minutes.

As the evolution of the GC run is displayed, the specific time associated with the spectrum, the detected pressure, type of plot, and temperature are displayed in the file parameters area 626.

Figure 3:
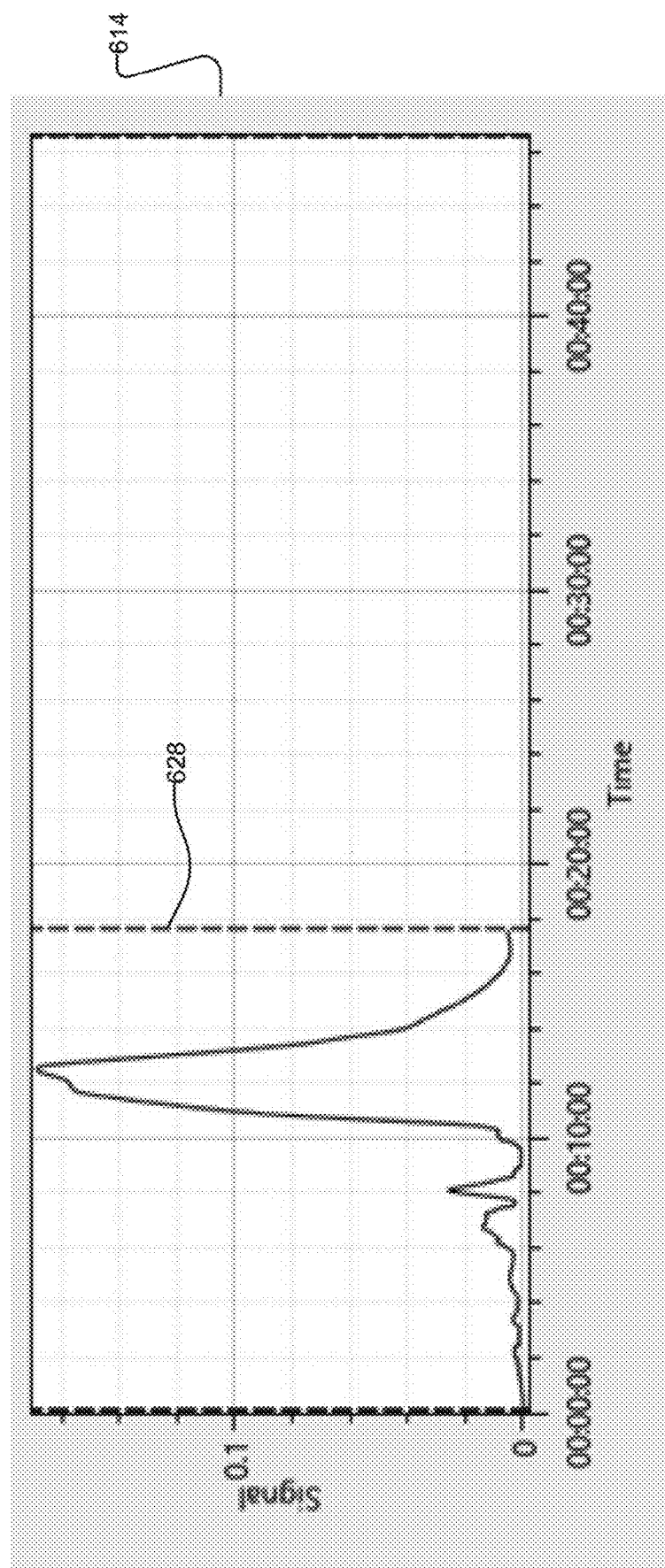
FIG. 3 shows the pseudo-chromatogram plot 614 of chromatogram tab at a midpoint in its evolution.

FIG. 3 shows the pseudo-chromatogram plot 614 at a midpoint in its evolution during playback. Specifically, a series of peaks are shown between the start of the GC run at time zero and the current point in time at approximately 18 minutes in the playback. The dotted line vertical boundary 628 shows the current point in time.

In this play mode, instantiated by user selection of the play button 620, this vertical dotted boundary 628 progresses across the plot 614 to show the progress of the chromatogram.

Figure 4:
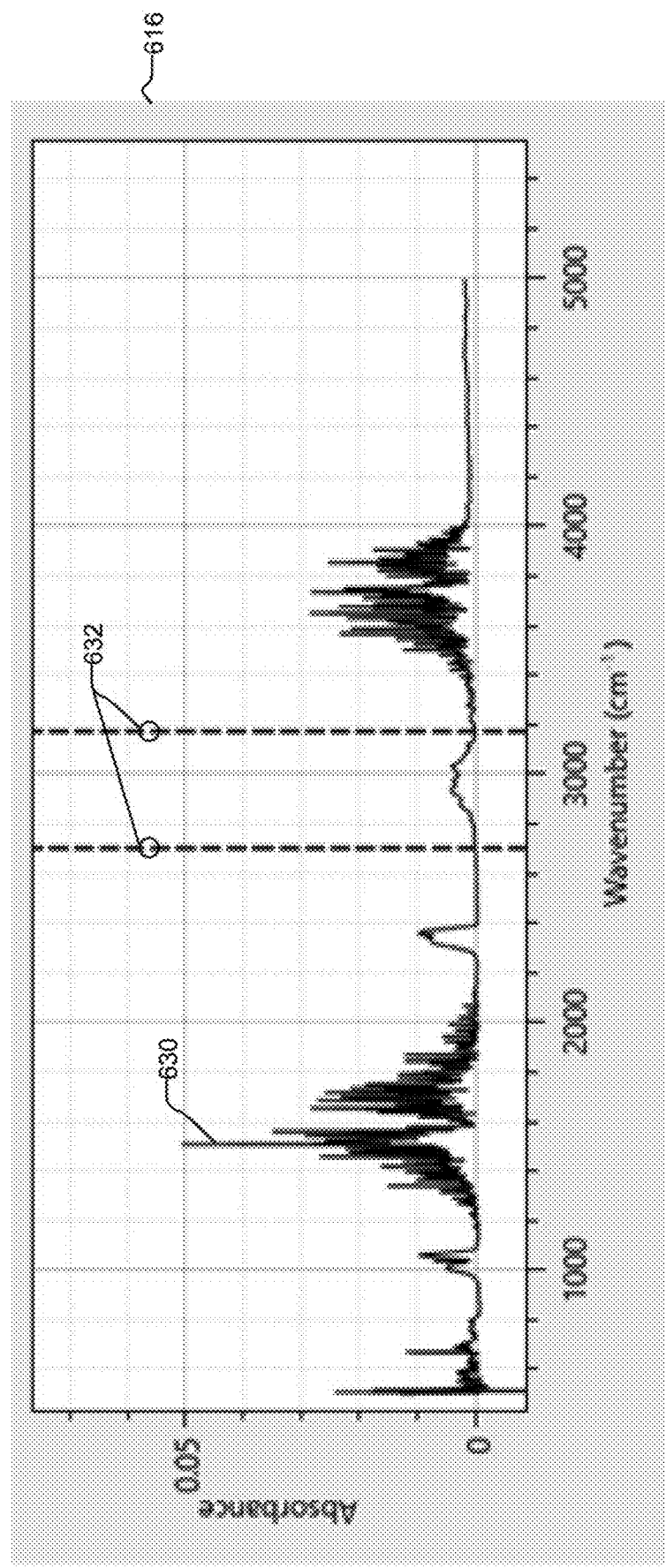
FIG. 4 shows the absorbance spectrum plot 616 of chromatogram tab at a midpoint in the GC run.

FIG. 4 shows the absorbance spectrum plot 616 at the approximately 18-minute point in the GC run. It shows an arbitrary detected spectrum, specifically an absorbance spectrum as a function of wave number.

Also shown are upper and lower spectral range markers 632. These can be adjusted within the chromatogram tab window 612, by the user indicating (clicking on) either of the markers, typically with a graphical pointing device such as a mouse, and moving the markers 632 to the right or left. These markers indicate the portion of the spectrum that is used to calculate the pseudo-chromatogram values shown in the pseudo-chromatogram plot 614. Specifically, by adjusting these spectral range markers 632, the user can control the portion of the absorbance spectrum that is used to calculate the chromatogram plot 614 using the Beer's law relationship. In this way, the user can avoid parts of the spectrum that include the spectral response of interference compounds or compounds that are not of interest. For example, if the sample contains large amounts of water, then the spectral range markers 632 will be located by the user to avoid regions of the spectrum that exhibit large spectral responses associated with water.

Figure 5:
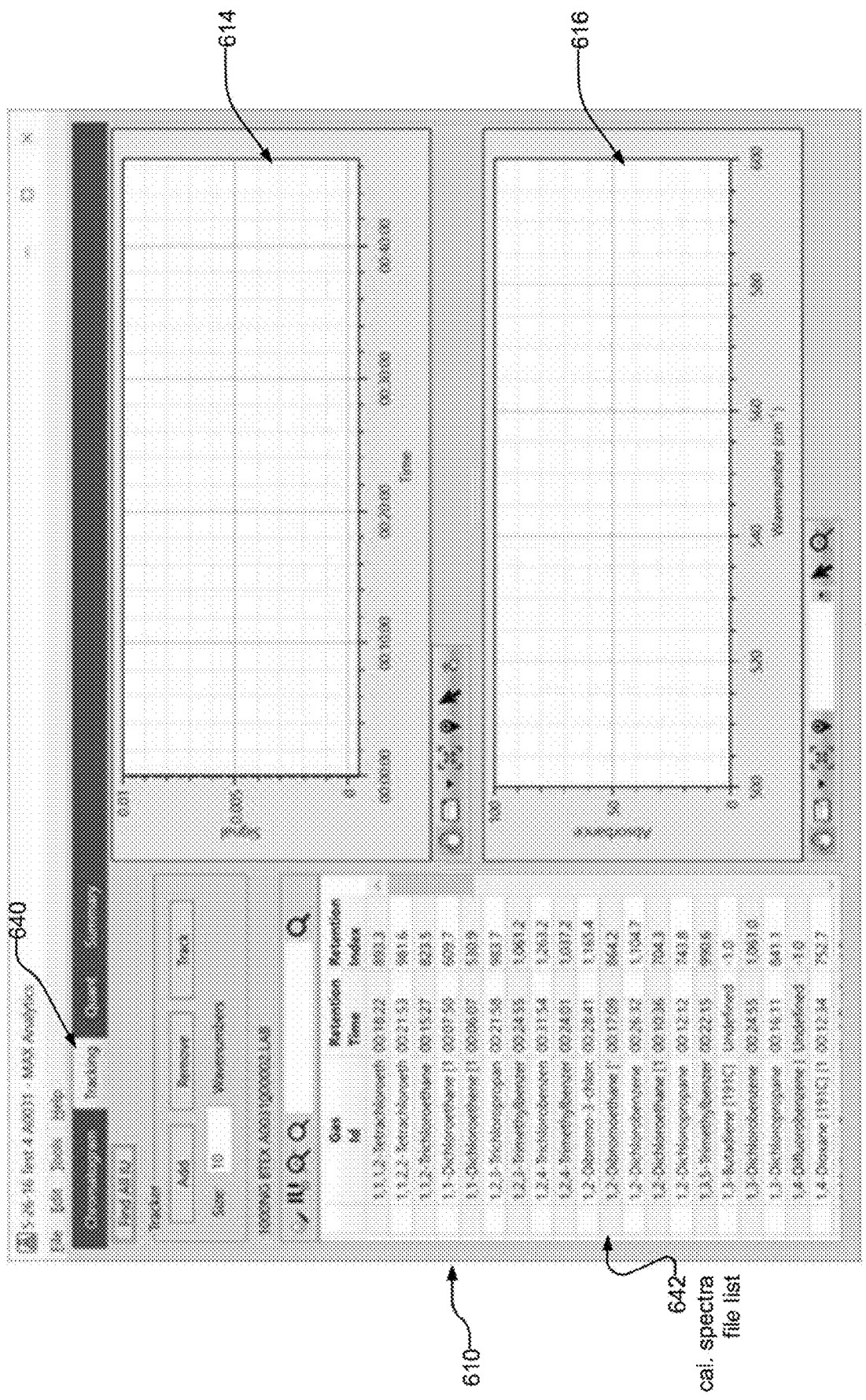
FIG. 5 shows a tracking tab of the analytics system window.

As shown in FIG. 5, the tracking tab 640 of the analytics system window 610. This tab is used to analyze the GC run for specific compounds of interest. When selected, the pseudo-chromatogram plot 614 and the absorbance spectrum plot 616 are displayed on the right side of the window and a list of compounds for which the system has calibration spectra are displayed in a calibration spectra file list 642. As shown in the calibration spectra file list 642, the specific compound associated with the calibration spectrum is listed in a left column. In two subsequent columns, the associated retention time and retention index are listed.

Figure 6:
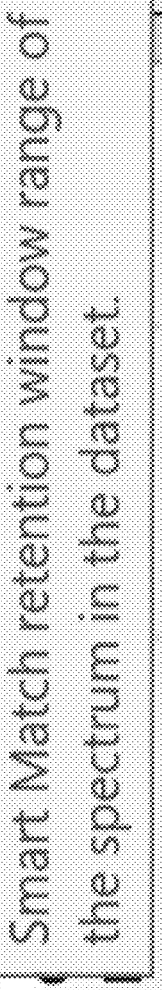
FIG. 6 shows the tracking tab of the analytics system window with a compound selected in the calibration spectra file list.

In this tab 640, the user will select a specific compound of interest as illustrated in FIG. 6, by double-clicking with the pointing device on a specific gas contained in the calibration spectra file list 642. In the illustrated example, the calibration spectral file associated with o-xylene has been selected 644.

Selection of this specific compound by the user causes the analytics system to access the series of absorbance spectra data files acquired during the GC run and associated with the time when the selected compound would have eluted from the GC. These spectral data files are accessed based on the compound's retention time and retention index. This will cause the system to process several hundred of the spectra data files or more associated with the GC run.

Figure 7:
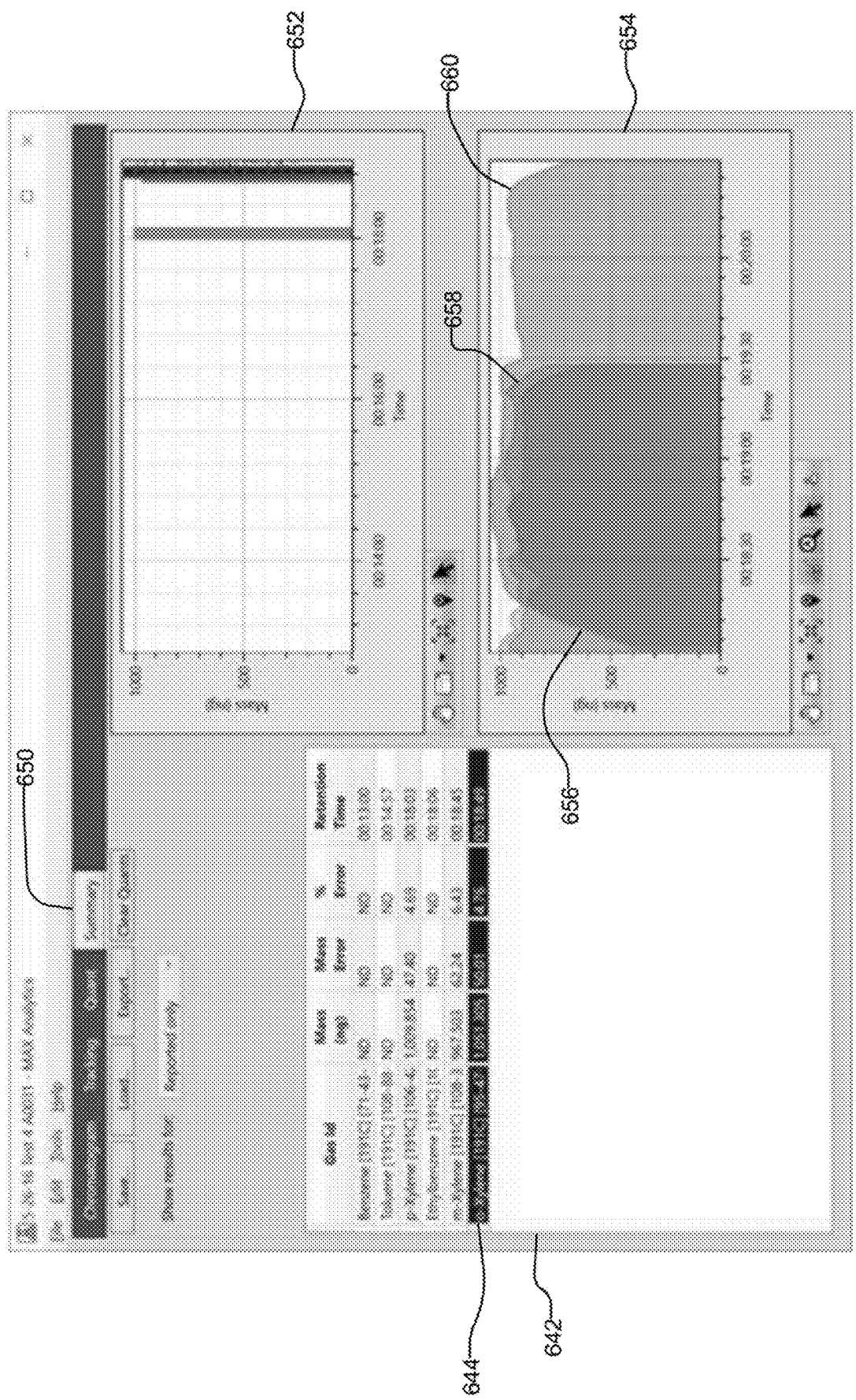
FIG. 7 shows a summary tab of the analytics system window in which a compound has been tracked.

The results are displayed in the summary tab 650 of the analytics system window 610 shown in FIG. 7.

In this tab, the calibration spectra file list 642 has been culled so that only those compounds that would have eluted at approximately the same time as the selected compound, o-xylene, are shown. Specifically, these are the compounds for which there are calibration spectral files, and the compounds have retention times that are similar to, or are overlapping with, the selected compound 644.

In the illustrated example, the detected mass, in nanograms, is shown for the selected compound 644 and other potential interfering compounds such as m-xylene and p-xylene. Other compounds that have similar retention times, such as benzene, are also shown. For each of these compounds, the detected mass is indicated. "ND" is used to indicate compounds that the compounds were not detected in the sample. Also indicated is the possible error in percent and the retention time for each of these compounds in a series of columns within the calibration spectra file list 642.

The retention index for the list of compounds is shown schematically in the retention index mass plot 652.

A detailed pseudo-chromatogram plot 654 is also shown. It shows the chromatogram plots for each of the separate detected compounds. Specifically, the chromatogram plot 656 shows the chromatogram for the compound of interest, o-xylene. Also shown are chromatogram plots 658, 660 for the other detected compounds.

Figure 8:
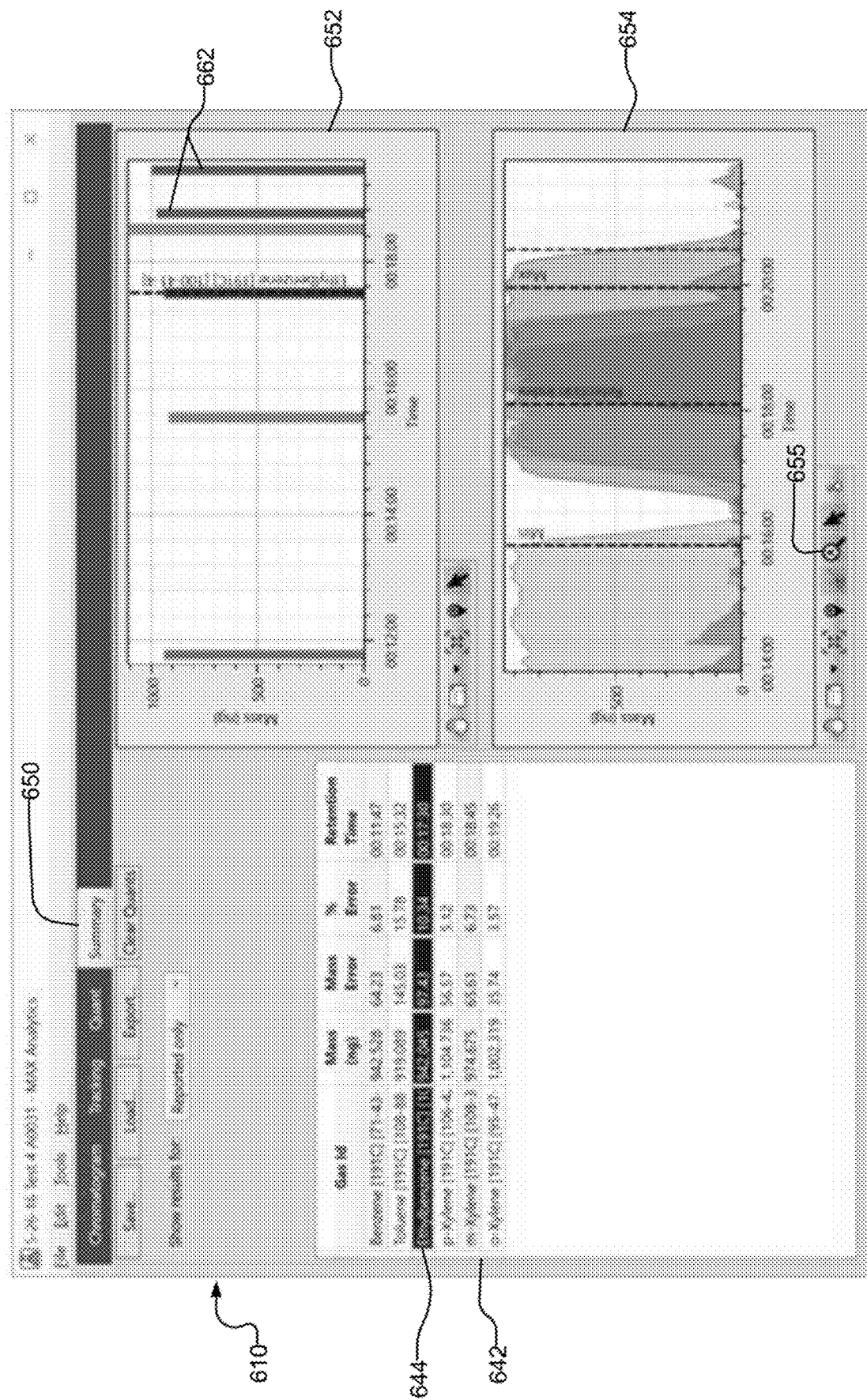
FIG. 8 shows the summary tab of the analytics system window for a different GC run.

FIG. 8 shows the summary tab 650 of the analytics system window 610 for a different GC run. Here, a different set of compounds are listed in the absorbance calibration spectra file list 642. Also shown is the retention index mass plot 652. This shows the detected mass graphically in the height of the bars 662 for the associated compounds. The bars are located at the nominal retention time specified by the absorbance calibration spectra file associated with that compound. The height of the bars represents the detected concentration in nanograms for each of the different compounds. The detailed pseudo-chromatogram plot 654 shows the actual pseudo-chromatograms for each of the compounds listed in the file list 642.

Figure 9:
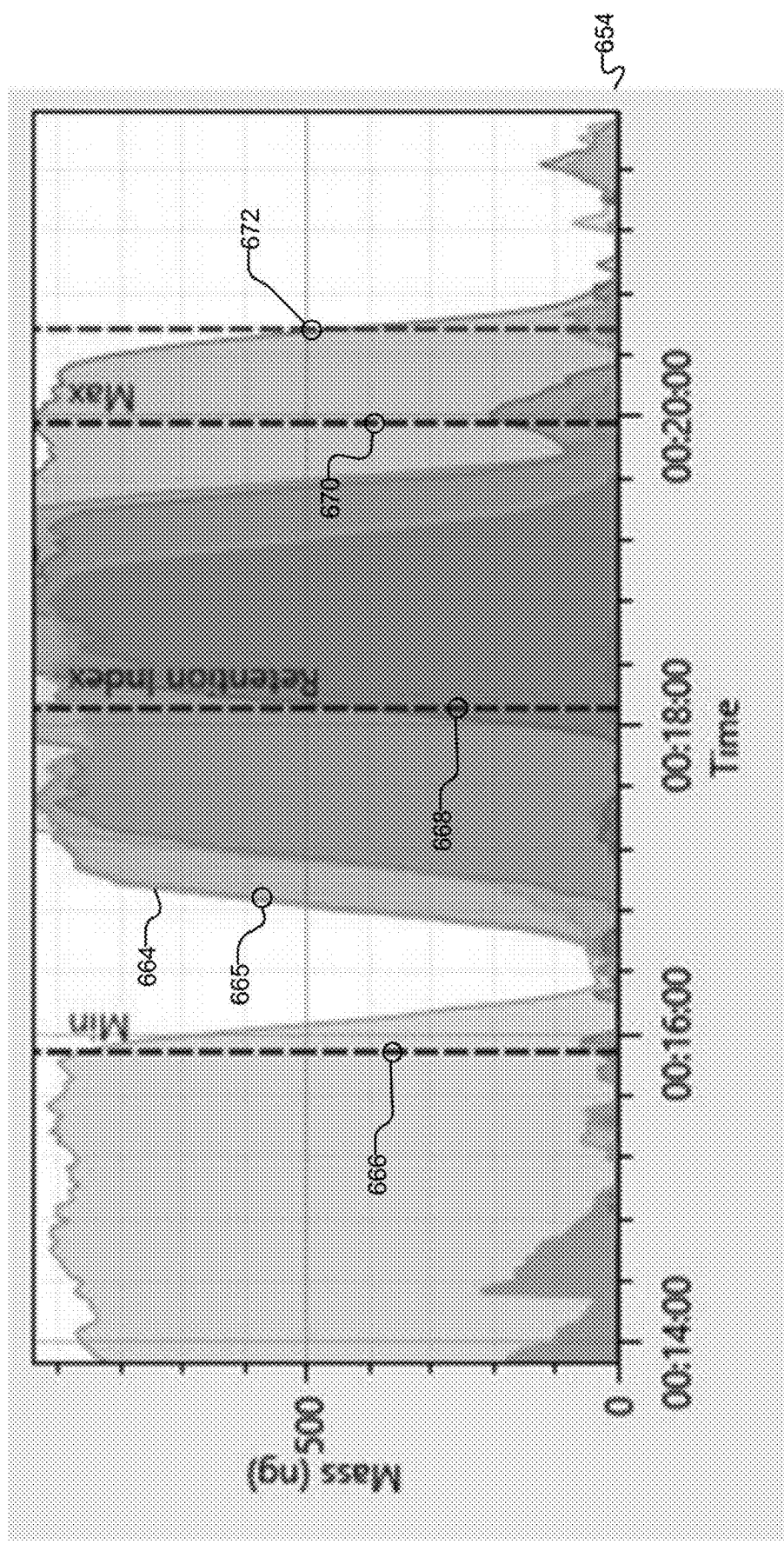
FIG. 9 shows the pseudo-chromatogram plot 654 of the summary tab of the analytics system window.

FIG. 9 shows the detailed pseudo-chromatogram plot 654 with greater detail. The selected compound 644 in the file list 642 has its corresponding chromatogram 664 highlighted with a corresponding visually-distinguishable boundary (outline) 665 that distinguishes it from the other overlapping chromatograms of the other compounds listed in the file list 642. Selecting a different compound in the file list 642 will cause that compound's chromatogram to be highlighted in the detailed pseudo-chromatogram plot 654 with the visually-distinguishable boundary. Specifically, each of the separate chromatograms for the different compounds are displayed with a semitransparent fill and preferably displayed with different colors (not shown in the current grayscale figures). This allows the different chromatograms for the different compounds to be viewed simultaneously in an overlapping fashion, yet the user can still distinguish the separate chromatograms for each of the different compounds, despite the fact that the compounds have eluted from the GC in overlapping time intervals.

Also shown in the detailed pseudo-chromatogram plot 654 are the retention characteristics of the selected compound.

The interface will automatically display these lines for the gas that is selected in the table on the view. Preferably a zoom feature is provided in which the user can use a mouse wheel or zoom tool 655 to zoom in/out for the displayed scale of the plot.

Specifically, a number of the retention characteristics are graphically displayed on the chromatogram plot 654. Specifically, the minimum retention time line 666 and the maximum retention time line 670 are displayed on the graph 654. The minimum line 666 corresponds to the time when the selected compound (ethylbenzene) 644 was first detected eluting from the GC. The maximum line 670 indicates when the ethylbenzene was no longer detected. These lines together show the retention window for the selected compound. Also shown is the retention index 668.

Line 672 correspond to a tool tip. Hovering the mouse for a second or two will cause this tool tip to appear.

In a current embodiment, the user is able to select a different compound in the file list 642 by selecting the boundary of the retention curve of interest within the detailed chromatogram plot 654. For example, by clicking on the retention curve in the chromatogram plot 654 associated with o-xylene, then that compound would be highlighted in the file list 644. Moreover, the plot will be updated to display the retention characteristics of o-xylene.

Figure 10:
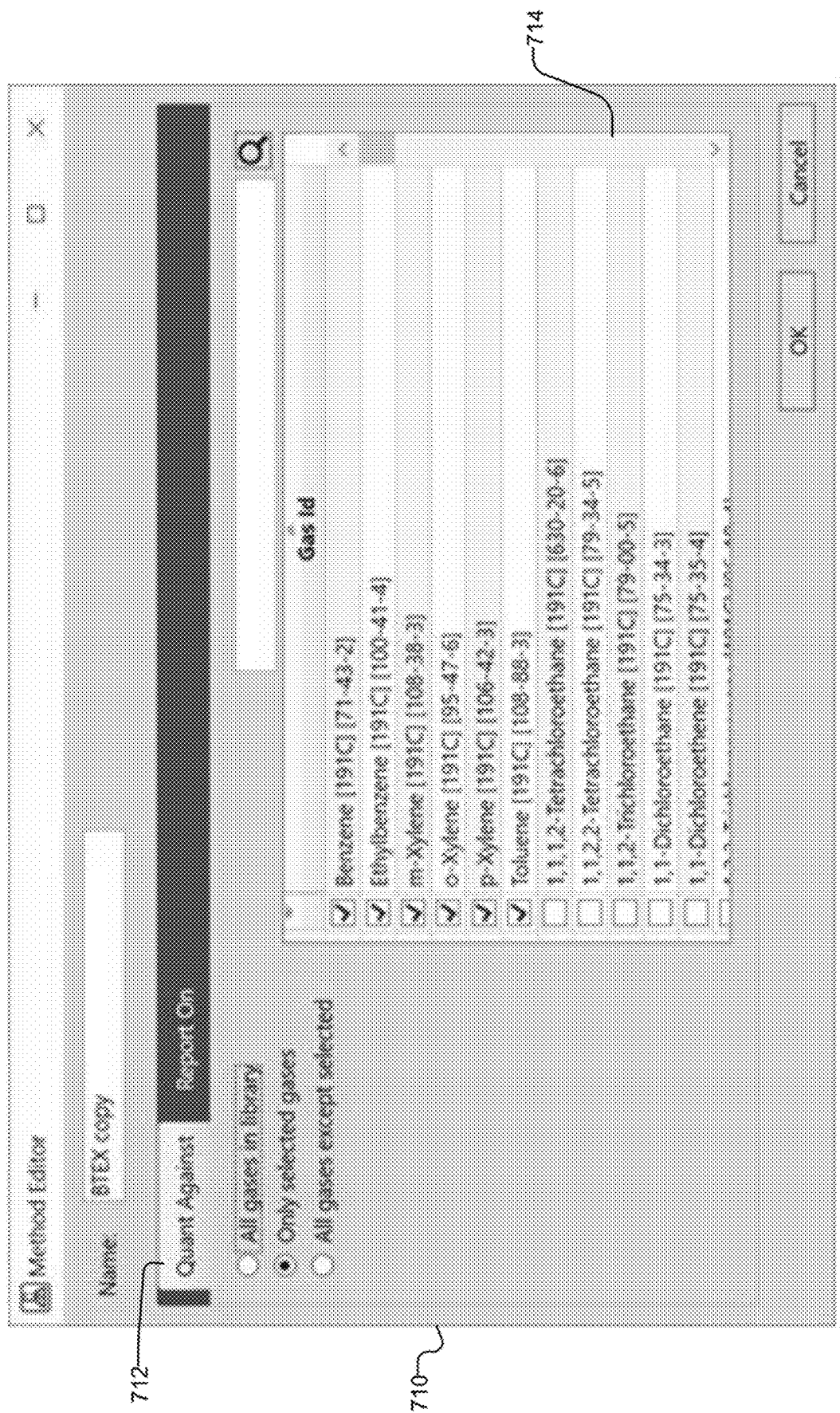
FIG. 10 shows quant against tab of a method editor window 710.

FIG. 10 shows a method editor window 710, which illustrates how the user can control the analytics system and select which compounds within the systems library it will quant. Specifically, by selecting among the radio buttons ("all gases and library", "only selected gases", and "all gases except selected"), the user can then indicate which of the gases in the gas library the system will quant. Specifically, in the illustrated example, the user has selected the radio button associated with "only selected gases". Then, in the gas ID list 714, the user has selected a series of gases (benzene, ethylbenzene, etc.) that the user wishes to quant. The system will then quant, i.e., determine the quantity or concentration of, these compounds.

Figure 11:
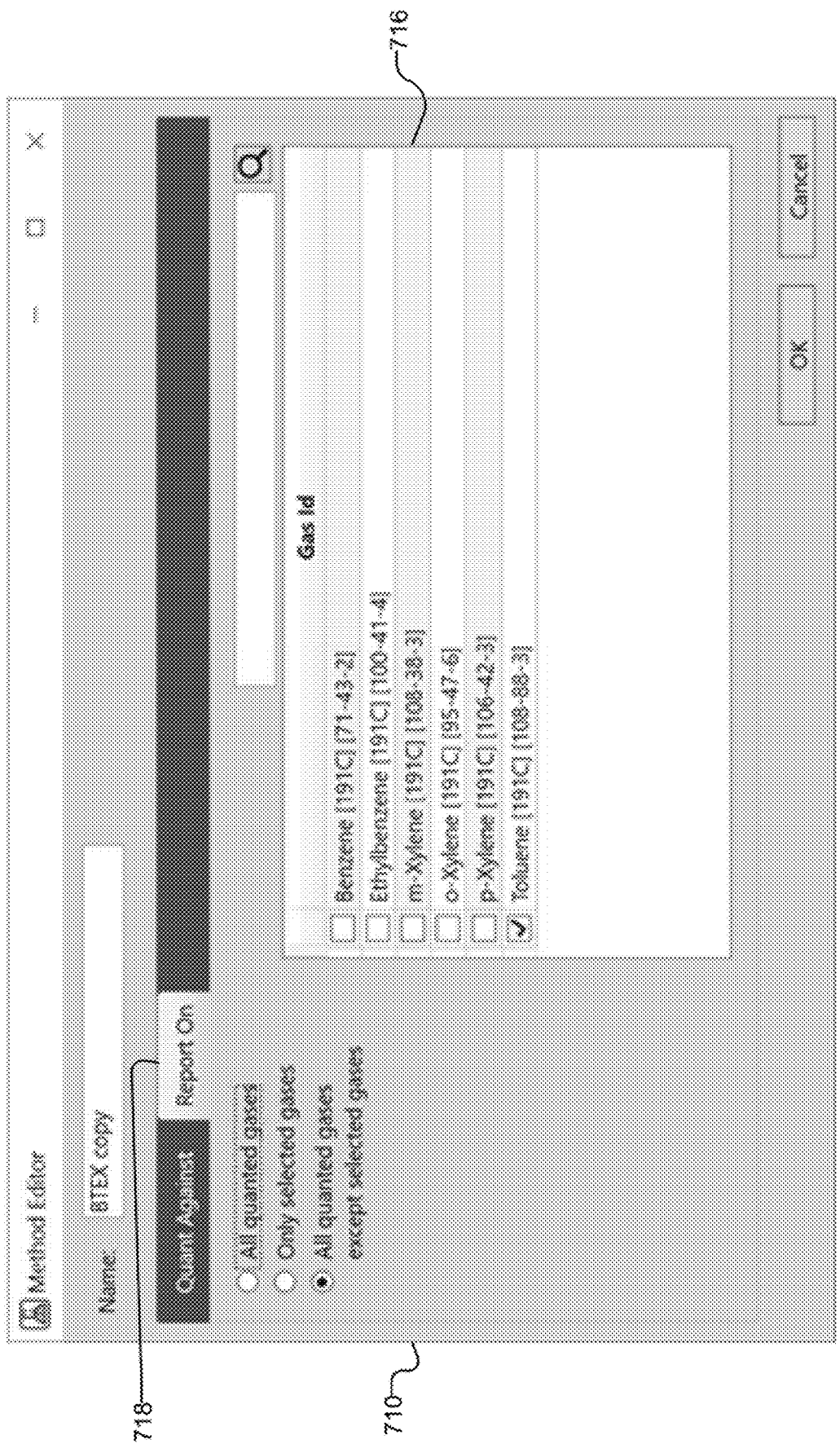
FIG. 11 shows the report on tab 718 of the method editor window 710.

FIG. 11 shows the report tab 718 of the method editor window 710. Here, the user selects which of the gases for which a report will be generated. Again, there are a series of radio buttons: "all quanted gases", "only selected gases", and "all (wanted gases except selected gases".

Here, in the gas ID list 716 are the list of gases that the user intended to quant for, as selected previously in the quant against tab 712. For this short list of quanted gases, the user can then select which of the gases for which a report will be generated by indicating the following gases using the checkboxes in the gas ID list 716.

Figure 12:
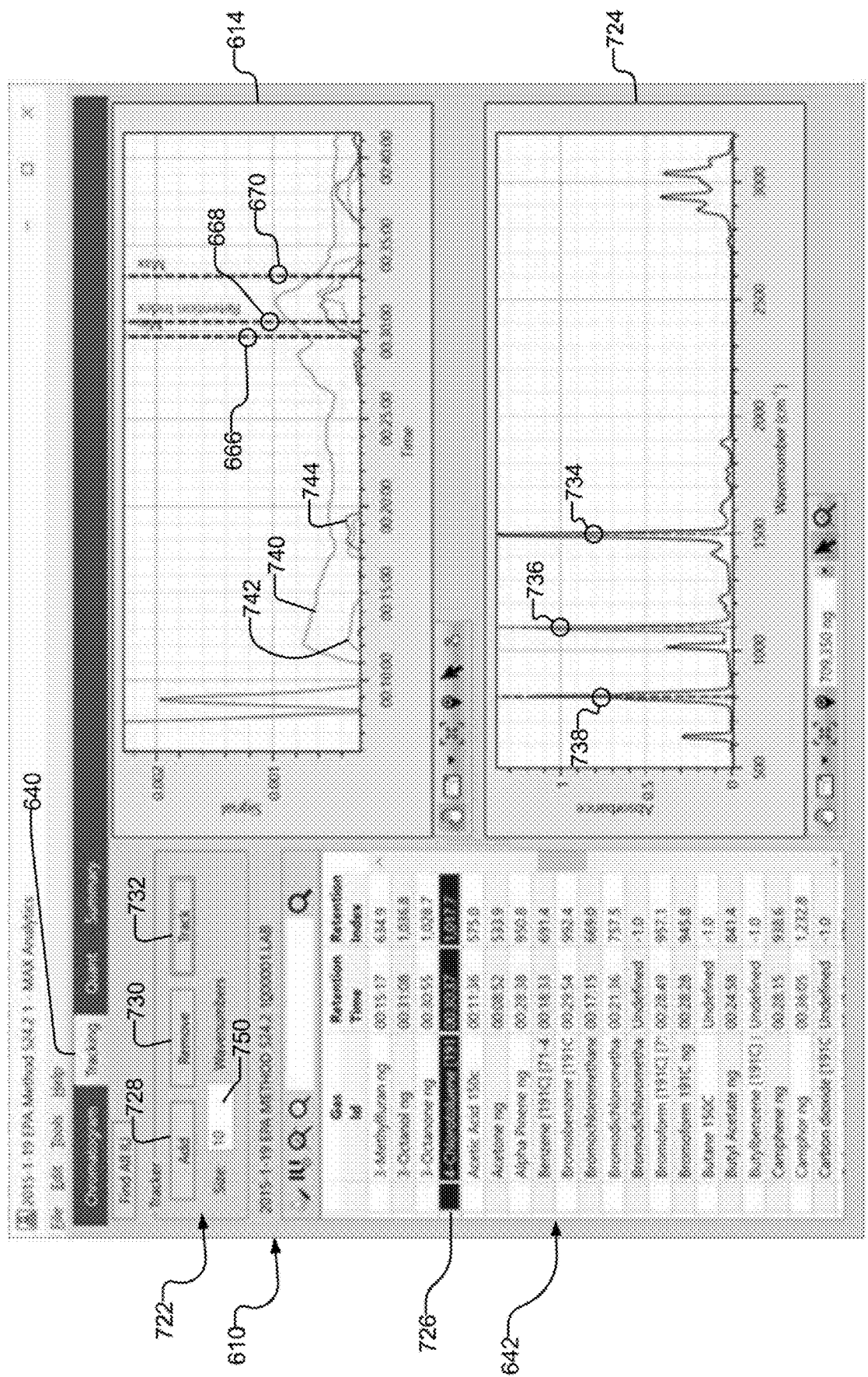
FIG. 12 shows the tracking tab 640 of the analytics system window 610 for another GC run.

FIG. 12 shows the tracking tab 640 of the analytics system window 610 for another GC run. Here, the pseudo-chromatogram for that GC run is shown in the pseudo-chromatogram plot 614. Also shown is the calibration spectra file list 642. This list shows the list of compounds for which there are calibration spectra loaded into the system.

As shown, when one of the compounds/calibration spectra is selected in the file list 642 (see selection 726 of 4-Chlorotoluene), the corresponding calibration spectrum is shown in the absorbance versus wave number calibration spectra plot 724. This shows the calibration spectra for 4-Chlorotoluene. As is characteristic of this compound, it exhibits three sharp peaks at approximately 750, 1100 and 1500 wave numbers. Further, selection of this compound shows the minimum retention line 666, the maximum retention line 670, and the retention index 668 in the pseudo-chromatogram 614. These correspond to the expected retention characteristics within the calibration file for this compound.

The tracking tab 640 further contains a tracking control area 722. Here there is an "add" graphical button 728, a "remove" graphical button 730, and a "track" graphical button 732. These are used to control the peak tracking based on the reference spectrum to analyze and track a specific compound within the GC run.

In more detail, selection of the "add" button 728 for the first time generates a primary tracking line 734 that is displayed in the calibration spectra plot 724. In the current embodiment, the system automatically places this first tracking line at the highest peak in the calibration spectra 724 for the selected compound 726. Selection of the "add" button 728 for a second time places a second line 736 at the second highest peak in the calibration spectrum 724, and selection of the "add" button 728 for a third time places a line at the third highest peak in the calibration spectrum 724. Further, in box 750, the user can enter a number, which corresponds to the number of wave numbers around the tracking lines that the system will look for peaks when analyzing the spectra from the GC run. In the illustrated example, the search will include a range of 10 wavenumbers in the neighborhood of each tracking line.

When analyzing spectra from the GC run, each tracking line is used to calculate the average wave number value in the sample spectrum around the neighborhood of each tracking line. Those averages are then graphed in the pseudo-chromatogram plot 614.

For example, graph 740 may correspond to tracking line 734, plot 742 may correspond to tracking line 736, and plot 744 may correspond to tracking line 738. As expected, all three of these tracking lines show values within the expected retention time associated with the selected compound 726.

This display can therefore be used as a rough indicator of whether or not the gas may be present in the sample. Ideally, the peaks should occur within or near the predicted retention window for the selected gas of interest. If the peaks occur outside the retention window, this may be an indication either that the gas is not present or the retention index information for that gas is not correct. Preferably, the user is able to adjust the location of the tracking lines by selecting a given tracking line and moving it within the calibration spectral plot 724.

A peak matcher may be used within different reference views in a number of ways to explain peaks in the sample. In the subtraction or recon views, it can be used to see what compounds might have been missed, explain where peak is coming from that cannot be explained by other compounds found in the sample. In an ideal world, the subtracted view will be a flatline if all the compounds were found in the sample, but for noise. In the reference view it can be used to determine what gases may create interferences with the peak in the reference spectrum.

Figure 13:
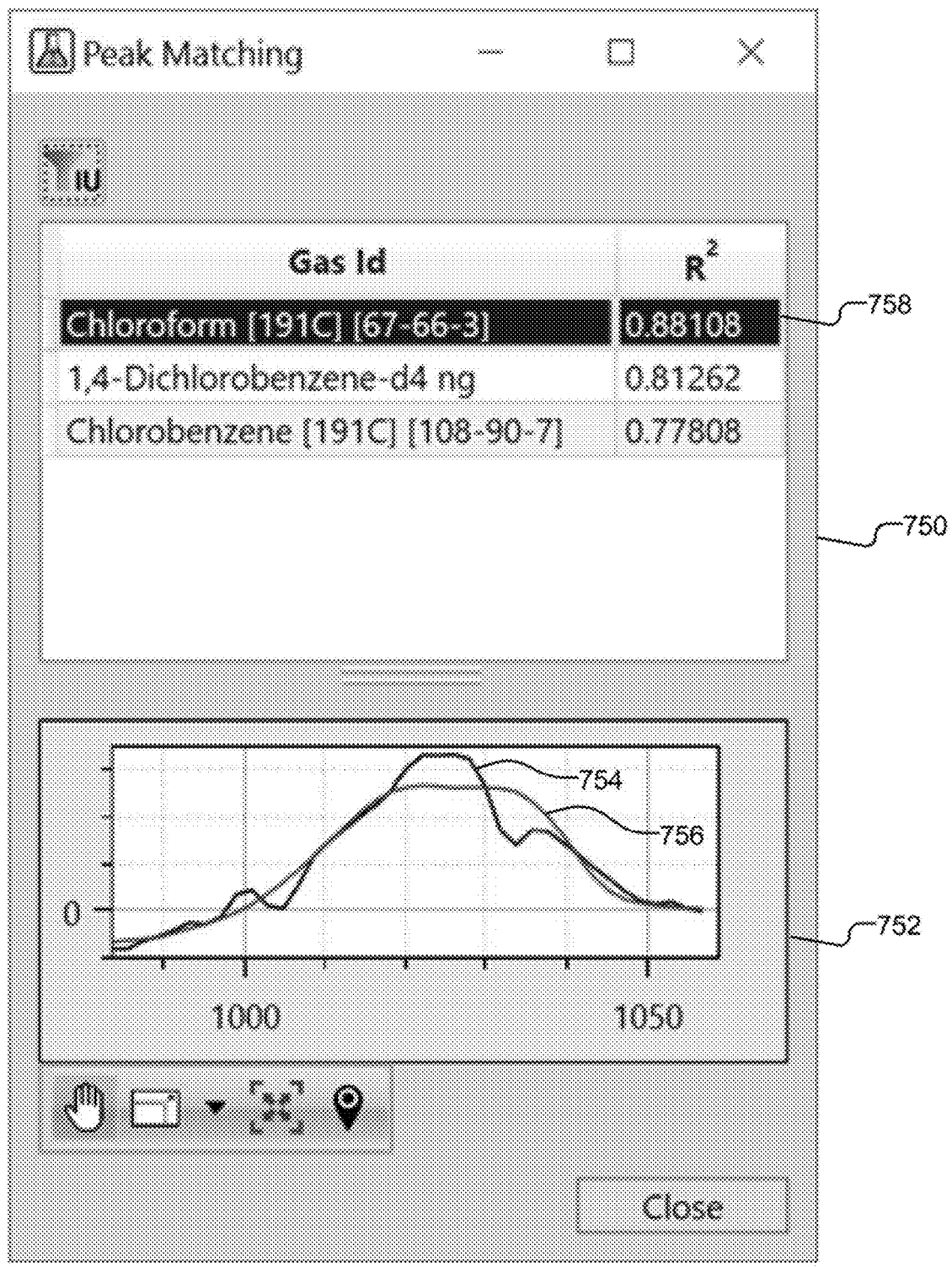
FIG. 13 shows the peak matching window 750.

FIG. 13 shows the peak matching window 750. It shows a number of gases with the R squared value indicating the accuracy of the match between the reference spectrum and the spectrum detected in the GC run. The spectral plot within the peak matching window 752 shows the reference peak 754 overlaid against the detected peak 756 from the spectrometry system or instrument. The compound list lists the different gases and the accuracy with which the reference spectra was matched to the spectra detected by the instrument.

Figure 14:
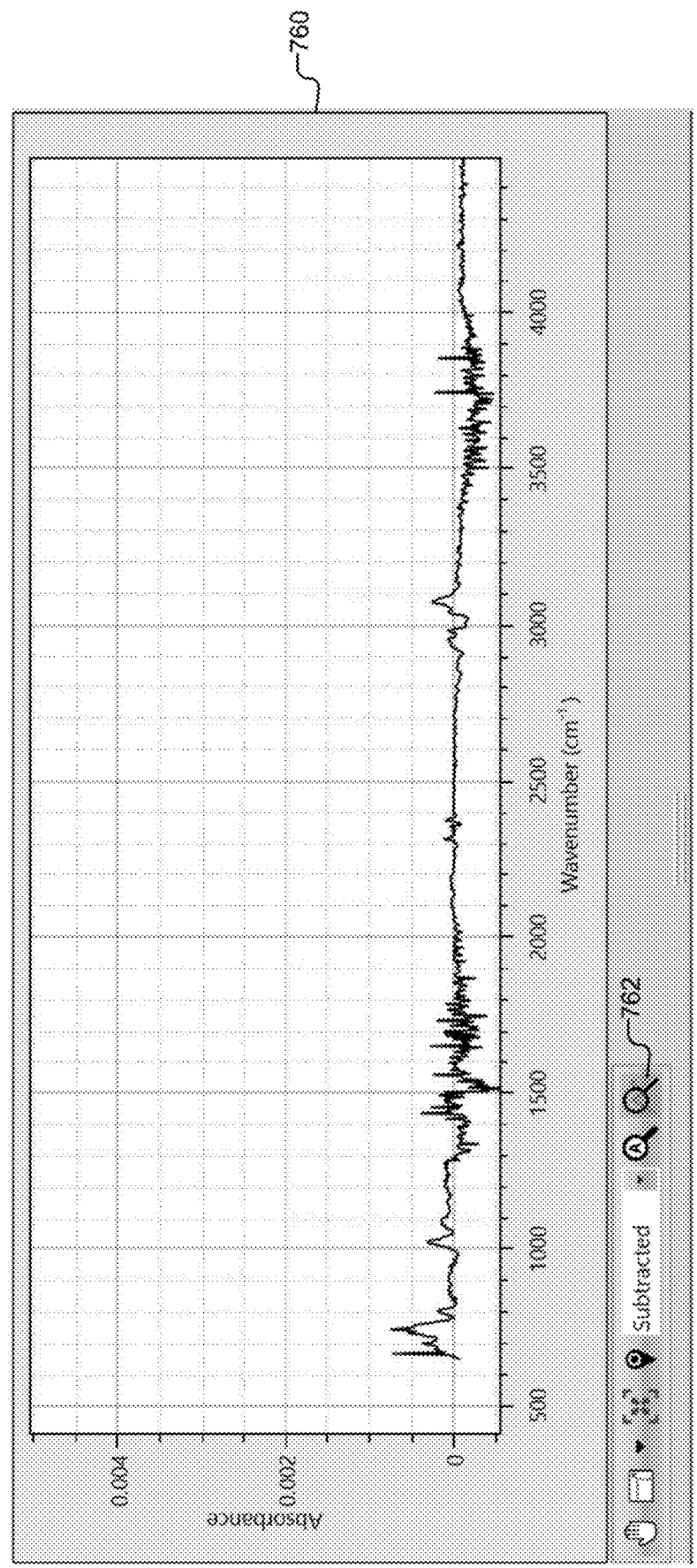
FIG. 14 shows a subtraction view.

FIG. 14 shows a subtraction view. Specifically, this is a plot of absorbance versus wave number 760. It shows potential residual errors in the analysis of the sample by showing the spectrum after the contributions of the known gases have been removed from the detected spectra of the instrument. The peak matching tool is selected by the user selection of the graphical button 762.

Figure 15:
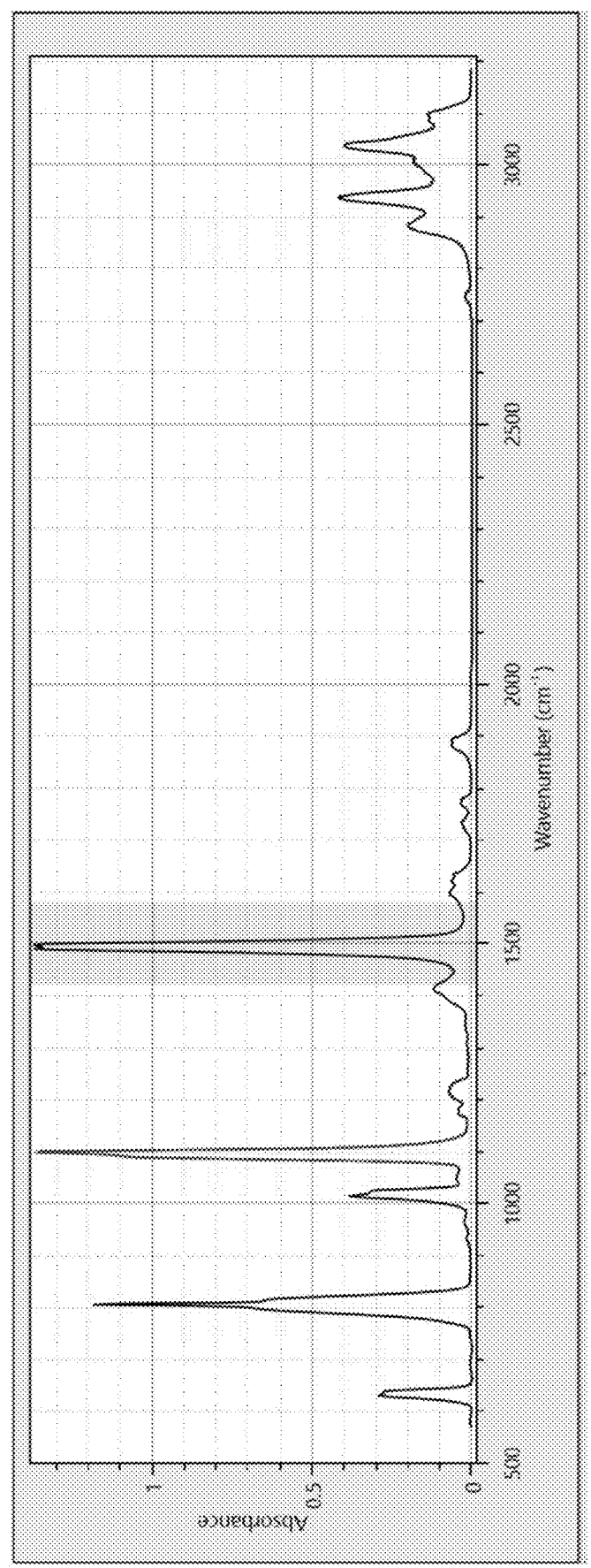
FIG. 15 shows the peak matching tool graphic view.

FIG. 15 shows the peak matching tool graphic view. Dragging the mouse in this view selects the portion of the spectrum to be matched against the reference spectrum library for gases that have similar features over the same wave number range.

Figure 16:
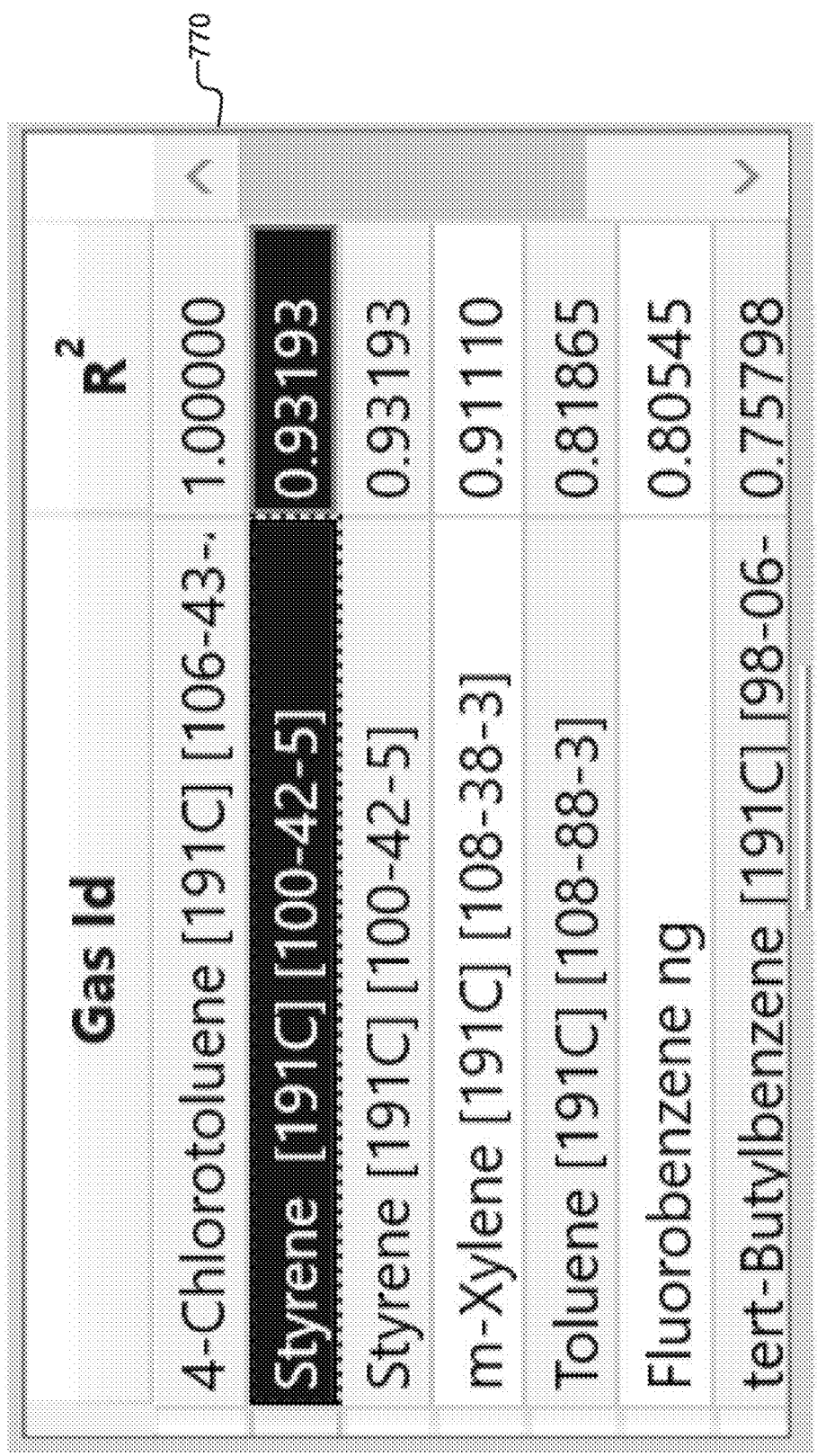
FIG. 16 shows a gas ID list 770.

FIG. 16 shows a gas ID list 770 that is generated after the user selects a portion of the spectrum in the peak matching tool graphic view. It shows a list of gases that share a common feature with the selected region. The list is in order by default from the best to worst fit with the cut-off of anything less than 0.75 $R^2$ not being shown. Selecting a particular gas of interest updates the peak matching window 752.

Figure 17:
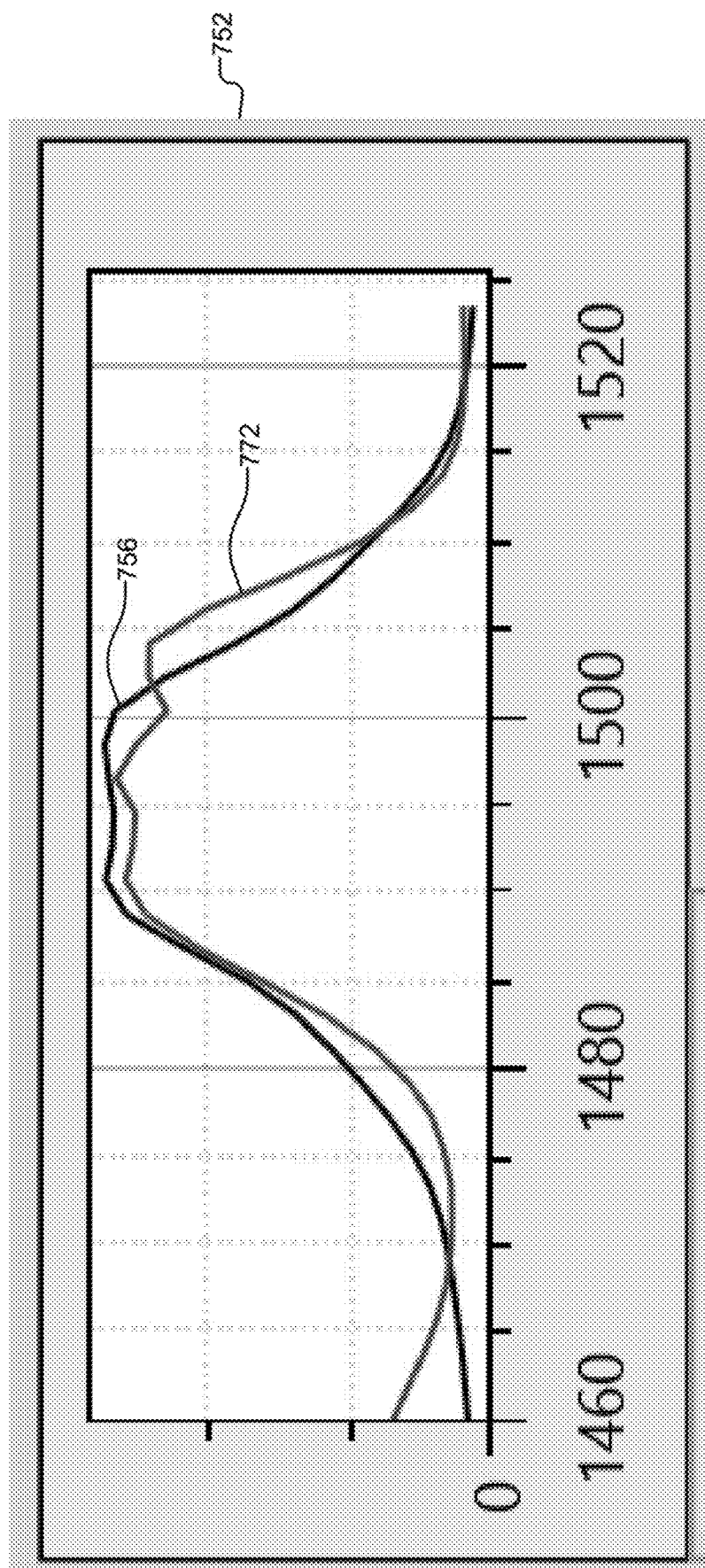
FIG. 17 shows the updated peak matching window 752 upon the selection of styrene in the gas ID list 770.

FIG. 17 shows the updated peak matching window 752 upon the selection of styrene in the gas ID list 770. Specifically, it shows the reference spectrum for styrene 772 against the measured spectra 756. It is further possible to filter the list displayed in the gas ID list 770 to only gases that have overlapping retention index windows. For the sample spectrum, the acquisition time of the spectrum is compared against the expected range from the reference spectrum library entries. When a matching reference spectrum is found against a reference spectrum, the system looks to see if the retention windows overlap.

While this invention has been particularly shown and described with references to preferred embodiments thereof, it will be understood by those skilled in the art that various changes in form and details may be made therein without departing from the scope of the invention encompassed by the appended claims.

What is claimed is:

1. A user interface for displaying information from an analytics system having a separation system and a spectrometric system, the user interface comprising:
    a chromatogram plot that is rendered on a display device displaying chromatograph signals as a function of time showing compounds eluting from the separation system;
    an absorbance spectrum plot that is rendered on the display device with the chromatogram plot that provides absorbance spectra corresponding to the chromatograph signals for the compounds; and
    a playback function that displays chromatograph signals in the chromatogram plot over the course of a run of the separation system and the corresponding detected absorbance spectra in the absorbance spectrum plot.

2. The user interface of claim 1, wherein the playback occurs at a higher speed than the run of the separation system from which the absorbance spectra were obtained.

3. The user interface of claim 1, wherein the playback occurs at at least 5 times faster than the run of the separation system from which the absorbance spectra were obtained.

4. The user interface of claim 1, wherein the chromatogram plot is a pseudo chromatogram plot.

5. The user interface of claim 1, wherein the separation system is a gas chromatography system and the spectrometric system is a Fourier transform infrared spectrometry system.

6. The user interface of claim 1, further comprising an absorbance spectral data file list showing the files containing the absorbance spectra.

7. The user interface of claim 1, further comprising upper and lower spectral range markers rendered on the display device and displayed on the absorbance spectrum plot indicating the portions of the absorbance spectra that were used to calculate the chromatogram signal of the chromatogram plot.

8. A sample analysis system comprising:
    a gas chromatography system for separating a sample into its compounds;
    a Fourier transform infrared spectrometry system for collecting absorbance spectra of the compounds;
    a computer system for receiving the absorbance spectra and generating a user interface on a display device, the user interface comprising a chromatogram plot that is rendered on display device and displaying chromatograph signals as a function of time showing compounds eluting from the gas chromatography system, an absorbance spectrum plot that is rendered on display device and that provides the absorbance spectra generated by the Fourier transform infrared spectrometry system; and a playback function that displays chromatograph signals in the chromatogram plot over the course of a run of the gas chromatography system and the corresponding detected absorbance spectra in the absorbance spectrum plot.

9. A user interface for displaying information from an analytics system having a separation system and a spectrometric system, the user interface comprising:
    a chromatogram plot that is rendered on a display device displaying chromatograph signals as a function of time showing compounds eluting from the separation system;
    an absorbance spectrum plot that is rendered on the display device with the chromatogram plot that provides absorbance spectra corresponding to the chromatograph signals for the compounds; and
    a list of compounds that is rendered on the display device for which calibration spectra are available, wherein selection of a compound from the list of compounds causes the analytics system to access absorbance spectral data files acquired during a run of the separation system at a time when the selected compound would have eluted from the separation system and determine an amount of the selected compound.

10. The user interface of claim 9, wherein the amount is provided in nanograms.

11. The user interface of claim 9, further comprising providing an amount of interfering compounds.

12. The user interface of claim 9, further comprising providing an amount of error.

13. The user interface of claim 9, wherein the list of compounds further includes retention times and retention indices.

14. The user interface of claim 9, further comprising culling the list so that only those compounds that would have eluted at approximately the same time as the selected compounds are shown.

15. The user interface of claim 9, further comprising displaying a retention index mass plot.

16. A user interface for displaying information from an analytics system having a separation system and a spectrometric system, the user interface comprising a pseudo-chromatogram plot, wherein selecting a compound from a file list causes a corresponding chromatogram to be highlighted.

17. The user interface of claim 16, wherein the chromatograph is highlighted with a visually-distinguishable boundary.

18. A user interface for displaying information from an analytics system having a separation system and a spectrometric system, the user interface comprising:
   a calibration spectral plot displaying a calibration spectrum that is rendered on a display device; and
   a peak tracking function that generates one or more tracking lines that are displayed in the calibration spectral plot on the display device, wherein the analytics system will find peaks indicated by the lines when analyzing the spectra from the spectrometric system to provide an indicator of whether or not the gas is present in a sample.

* * * * *